United States Patent [19]
Morgan

[11] 4,050,474
[45] Sept. 27, 1977

[54] CONTROLLER FOR FLUID PRESSURE OPERATED DEVICES PROVIDING HIGH PRESSURE TO AN AUXILIARY DEVICE

[75] Inventor: David F. Morgan, Minnetonka, Minn.

[73] Assignee: Eaton Corporation, Cleveland, Ohio

[21] Appl. No.: 677,656

[22] Filed: Apr. 16, 1976

Related U.S. Application Data

[63] Continuation of Ser. No. 507,041, Sept. 18, 1974, Pat. No. 3,960,234.

[51] Int. Cl.² .......................................... B62D 5/08
[52] U.S. Cl. ................................. 137/596; 60/384; 137/625.24; 418/61 B
[58] Field of Search ................ 180/132; 137/625.13, 137/625.15, 625.24, 625.68, 596; 60/384, 386; 418/61 B; 91/375 R

[56] References Cited

U.S. PATENT DOCUMENTS

| | | | |
|---|---|---|---|
| 3,834,278 | 9/1974 | Goff | 137/625.68 |
| 3,960,234 | 6/1976 | Morgan | 180/132 |

FOREIGN PATENT DOCUMENTS

| | | | |
|---|---|---|---|
| 638,610 | 3/1962 | Canada | 91/375 |

Primary Examiner—Joseph F. Peters, Jr.
Assistant Examiner—John A. Pekar
Attorney, Agent, or Firm—Teagno & Toddy

[57] ABSTRACT

A controller for fluid pressure operated devices such as power steering systems is provided. The controller is of the type having an inlet for receiving a system fluid flow, an outlet, a pair of control fluid ports for connection to a primary fluid pressure operated device and an auxiliary fluid port for connection to an auxiliary fluid pressure operated device or system. The controller includes a valve means having a primary valve member and a follow-up valve member, the valve members defining a neutral position relative to each other. A fluid meter includes a movable member coupled to the follow-up valve member. The primary and follow-up valve members cooperate with the housing to define a first flow path including the inlet, one of the control fluid ports, the fluid meter, the other of the control fluid ports, and the outlet when the valve members are relatively displaced from the neutral position. The primary and follow-up valve members cooperate with the housing to further define a second flow path communicating between the inlet and the auxiliary fluid port when the valve members are in the neutral position. Both the first and second flow paths are capable of receiving substantially all of the system fluid flow, but with the primary fluid pressure device having priority to receive the full system fluid flow when it is needed, such as to control a power steering cylinder.

2 Claims, 6 Drawing Figures

CONTROLLER FOR FLUID PRESSURE OPERATED DEVICES PROVIDING HIGH PRESSURE TO AN AUXILIARY DEVICE

This is a continuation of application Ser. No. 507,041, filed Sept. 18, 1974, now U.S. Pat. No. 3,960,234.

BACKGROUND OF THE DISCLOSURE

The present invention relates to a controller for fluid pressure operated devices and, more particularly, to a controller capable of providing full system fluid flow to an auxiliary device when the primary device does not require the full flow.

Although the present invention is equally adaptable to any controller for fluid pressure operated devices wherein the controller utilizes a valve spool arrangement, it is especially advantageous when used in controllers for power steering systems of the type employed in off-the-road vehicles, and will be described in connection therewith. More specifically, although the invention will be described in connection with rotatable spool-sleeve valve arrangements, it will be appreciated that the invention may also be utilized with spool valves which operate in response to axial movement.

A controller for a power steering system of the type to which the present invention pertains is described in U.S. Reissue Pat. No. 25,126, assigned to the assignee of the present invention. Controllers of the type disclosed in the cited reissue patent have become well known in the art and generally comprise a housing having an inlet and an outlet and a pair of control fluid ports, feeding a power steering cylinder. The vehicle steering wheel is directly connected to the controller and when in the neutral (no input torque) condition, fluid may pass from the inlet through the valve to the outlet (open center system).

When the steering wheel is rotated in one direction from the neutral position, the valve is displaced and fluid flows from the inlet through the valve, to the meter, then to one of the control fluid ports to move the power steering cylinder. When the steering wheel is rotated in the opposite direction, the valve rotates in the opposite direction and fluid flows from the inlet port through the valve, then through the fluid meter in the opposite direction, then to the other of the control fluid ports to move the power steering cylinder in the opposite direction.

Conventionally, controllers of the type described have utilized rotary spool-sleeve valves to direct the flow of fluid from the inlet port in accordance with the rotational position of the steering wheel. In general, rotary spool-sleeve valves comprise a primary valve member (spool) connected directly to the steering wheel and a follow-up valve member (sleeve) surrounding the spool. Axially adjacent the spool and sleeve is a fluid meter, generally a gerotor having an externally toothed member coupled to orbit within an internally toothed member held in fixed position relative to the valve housing. The externally toothed member is splined to a drive shaft, at the opposite end of which the drive shaft is coupled to the sleeve, such as by a pin passing therethrough. When the spool is rotated, fluid is permitted to flow to the meter, causing the externally toothed member to orbit, thus imparting follow-up movement to the sleeve by means of the drive shaft. Generally, the sleeve has a plurality of orifices extending radially therethrough and the spool has a plurality of axially extending grooves on its outer surface to provide communication between certain of the orifices in the sleeve.

Power steering systems for off-the-road vehicles and the controllers used therein require expensive, complicated hydraulic pumping aparatus to provide the full system fluid flow capability required to actuate the power steering cylinder. Such off-the-road vehicles frequently utilize other hydraulically operated devices which also require approximately the full system fluid flow for their operation. Therefore, it has long been an objective of those working in the hydraulic power steering art to provide a system in which the full system fluid flow would be available to such an auxiliary device when not required by the steering system. Conventionally, the attempts at providing such a system have involved the use of a "load sensing" arrangement in which either a pressure sensing or flow sensing device has been included within the controller to sense the demand or lack of same for full flow by the steering system. This sensing device would, in turn, actuate a valve to divert or redirect the flow in response to a determination that the flow was not required by the steering system and was available for the auxiliary device. Other conventional systems apply a flow control valve with priority flow maintained by pressure compensation to supply a fixed flow rate to the primary (steering) circuit, with the excess (bypass) flow directed to a secondary circuit, thus requiring a larger pump to supply both circuits. With certain modifications, the prior art "high pressure carryover" or "power beyond" power steering systems have generally conformed to the above descriptions, thus requiring some sort of sensing device built into the controller or in fluid communication therewith, as well as additional valving and fluid flow conduits associated with the controller. Thus, the controllers for such high pressure carryover systems have been substantially more complicated and expensive than the basic controller and, in some instances, have had certain operational disadvantages, such as a transition from steering operation to auxiliary operation which is not smooth enough and/or too slow.

SUMMARY OF THE INVENTION

Accordingly, it is an object of the present invention to provide a power steering system and controller for use therein having the capability of full system fluid flow to an auxiliary device, but with full priority to the primary device (the steering system).

It is more specific object of the present invention to provide a power steering system and controller having the capability of full system fluid flow to either the auxiliary (high pressure carryover) circuit or primary device, directly in response to the rotational position of the steering wheel and controller valve means, without the need for additional control devices, valving, or hydraulic circuitry.

It is even more specific object of the present invention to provide a controller in which the above stated objects are achieved, and wherein the controller valve means is utilized to direct the system fluid flow coming from the inlet to either the auxiliary circuit or the primary device in response to the relative rotational positions of the valve spool and valve sleeve.

These and other objects of the present invention, which will become apparent within the following detailed description, are accomplished by the provision of a controller including a housing having an inlet for receiving the full system fluid flow, an outlet, a pair of control fluid ports for connection to a primary fluid pressure operated device and an auxiliary fluid port for connection to an auxiliary circuit. The controller has a valve means including a primary, rotatable valve member and a cooperating, relatively rotatable follow-up valve member, the valve members defining a neutral position relative to each other. A fluid meter includes a movable member coupled to the follow-up valve member, to impart follow-up movement thereto. The primary and follow-up valve members cooperate with the housing to define a first flow path communicating from the inlet to one of the control fluid ports through the fluid meter and from the other of the control fluid ports to an outlet when the valve members are relatively displaced from the neutral position. The primary and follow-up valve members cooperate with the housing to further define a second flow path communicating between the inlet and the auxiliary fluid port when the valve members are in the neutral position, both the first and second flow paths being capable of receiving substantially all of the system fluid flow.

DESCRIPTION OF THE PREFERRED EMBODIMENT

Steering System

Figure 1:
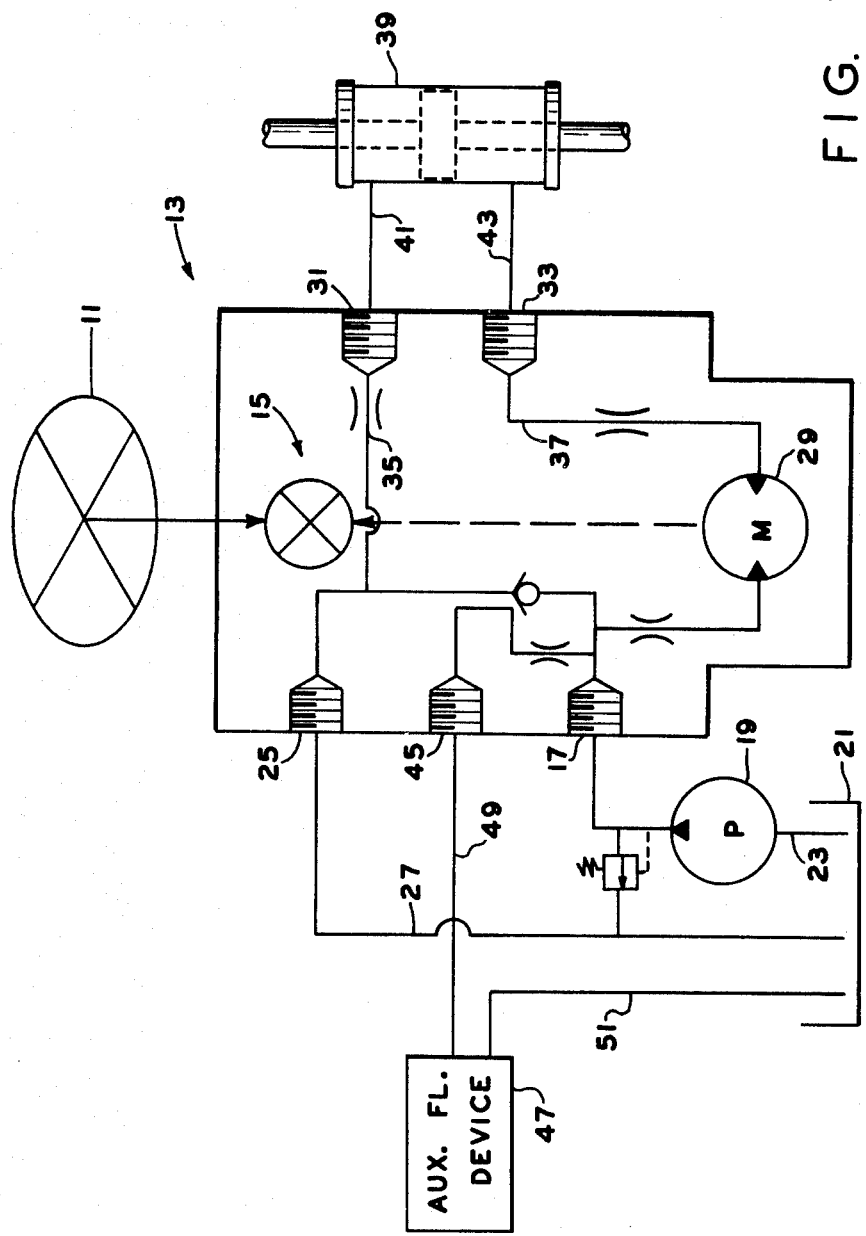
FIG. 1 is a diagrammatic view of a vehicle power steering system and controller to which the present invention may be applied.

Referring now to the drawings which are for the purpose of illustrating a preferred embodiment of the invention, and not for limiting the same, FIG. 1 illustrates diagrammatically a vehicle power steering system of the type which has become well known in the art and comprises, in general, a steering wheel 11 operably connected to a controller 13 and, more specifically, to the valve means 15. The controller 13 is provided with an inlet port 17 through which the controller 13 receives the full system fluid flow from a source, such as a pump 19, which is connected to a reservoir or tank 21 by a conduit 23. The controller 13 is also provided with an outlet port 25 connected to the reservoir 21 by a conduit 27. Associated with the controller is a fluid meter 29 operably connected to the valve means 15 to meter or measure fluid flow in response to rotational movement of the steering wheel 11 and valve means 15. The controller includes a left turn port 31 and a right turn port 33, the left turn port 31 being fed by a flow path 35 and the right turn port 33 being fed by a flow path 37, the diagram of FIG. 1 illustrating the system in a right turn condition, and the flow path 37 being shown connected to the fluid meter 29. A power steering cylinder 39 is operated by the controller 13 by means of a conduit 41 connected to the left turn port 31, and a conduit 43 connected to the right turn port 33. The controller 13 includes an auxiliary fluid port 45, from which fluid is communicated to an auxiliary control device 47 by means of a conduit 49. The auxiliary device 47 is also connected to the reservoir 21 by a conduit 51. For purposes of illustration, the power steering system of FIG. 1 is shown in a right turn condition. It is a feature of the present invention that the discharge from outlet port 25 through conduit 27 is kept separate from the auxiliary fluid flow from port 45 to the device or system 49, as opposed to, for example, using the return flow (or neutral flow) to feed the auxiliary device, in which case the auxiliary device did not have available the full system pressure differential.

Controller

Figure 2:
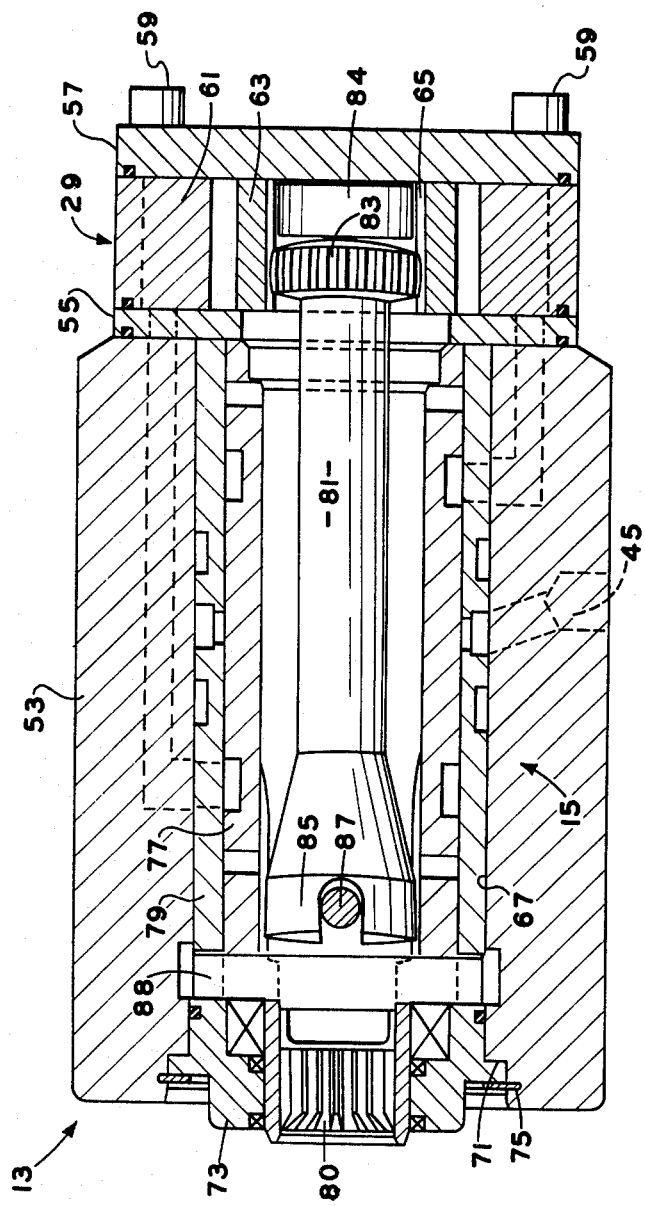
FIG. 2 is an enlarged view, in axial cross section, of the controller shown diagrammatically in FIG. 1.

FIG. 2 is an axial cross section of the controller 13 taken on a plane such that none of the ports 17, 25, 35 or 37 is visible, but only the auxiliary fluid port 45. The controller 13 includes a housing 53, a plate 55, the fluid meter 29 and an end plate 57. These sections are fastened in tight engagement by a plurality of bolts 59 passing into tapped holes (not shown) in the housing 53.

The fluid meter 29 includes an internally toothed member 61 held in a fixed relationship with respect to the plate 55 and end plate 57 by the bolts 59. Eccentrically disposed within the internally toothed member 61 is an externally toothed member 63 having a splined central opening 65. The controller housing 53 defines a substantially cylindrical, axially extending opening 67 within which is rotatably disposed the valve means 15. At the forward end of housing 53 in a recess 71 against which is seated an end cap 73, retained in place by a retaining ring 75.

The valve means 15 comprises a primary, rotatable valve member (spool) 77, and a cooperating, relatively rotatable follow-up valve member (sleeve) 79. The spool 77 terminates at its forward end in an internal spline portion 80 for connection to an externally splined shaft (not shown) attached to steering wheel 11. The sleeve 79 is coupled to the spool 77 by means of a drive shaft 81 having, at its rearward end, a crowned splined head 83 in engagement with the splined central opening 65 of the externally toothed member 63, with the drive shaft 81 being restrained from axial movement, in part, by a spacer 84 between splined head 83 and end plate 57. At the opposite end of the drive shaft 81 is a bifurcated end portion 85 through which passes a transverse drive pin 87. The transverse drive pin 87 passes through an opening in the spool 77 and engages the sleeve 79 in a manner well known in the art, and which forms no part of the present invention. Disposed approximately at right angles to the pin 87 is a plurality of leaf springs 88 urging spool 77 and sleeve 79 toward the neutral position relative to each other. Certain other details of the construction and operation of such controllers which also form no part of the present invention may be better understood by reference to the previously cited U.S. Reissue Pat. No. 25,126, assigned to the assignee of the present invention.

Figure 5:
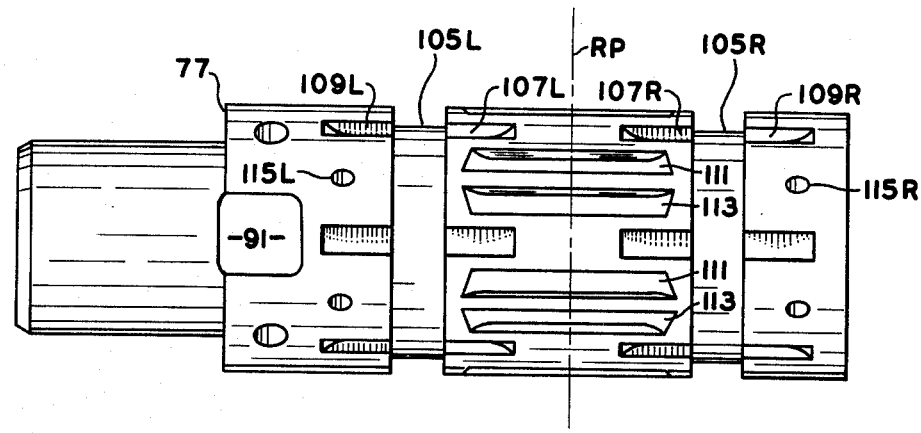
FIG. 5 is a side elevation of the valve spool used in the controller.
Figure 6:
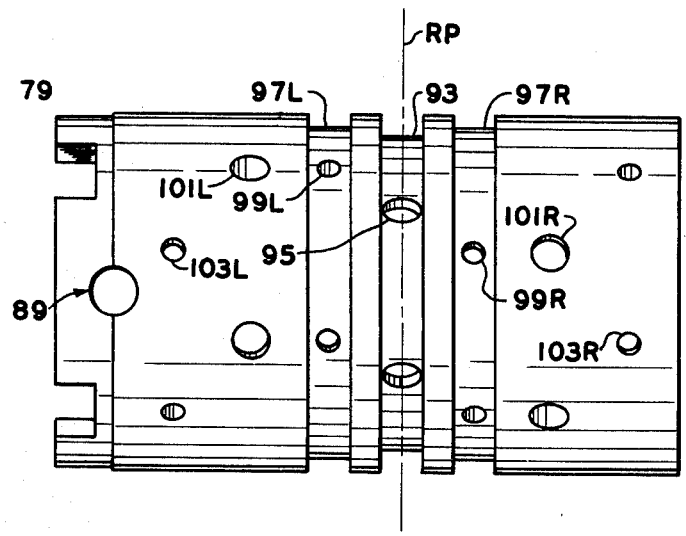
FIG. 6 is a side elevation of the valve sleeve used in the controller.

FIGS. 5 and 6 are side elevations of the valve spool and valve sleeve, respectively, on approximately the same scale as FIG. 2. In both FIGS. 5 and 6, there is shown a reference plane RP oriented perpendicular to the axes of rotation of spool 77 and sleeve 79, the plane RP being included to facilitate an understanding of the present invention.

The valve sleeve 79 includes a pair of diametrically opposed pin holes 89 (only one of which is shown in FIG. 6), adapted to engage the transverse drive pin 87. Similarly, the valve spool 77 includes a pair of diametrically opposed pin slots 91 (only one of which is shown in FIG. 5), to permit the drive pin 87 to pass therethrough without engaging the spool 77, except at maximum deflection.

Figure 4:
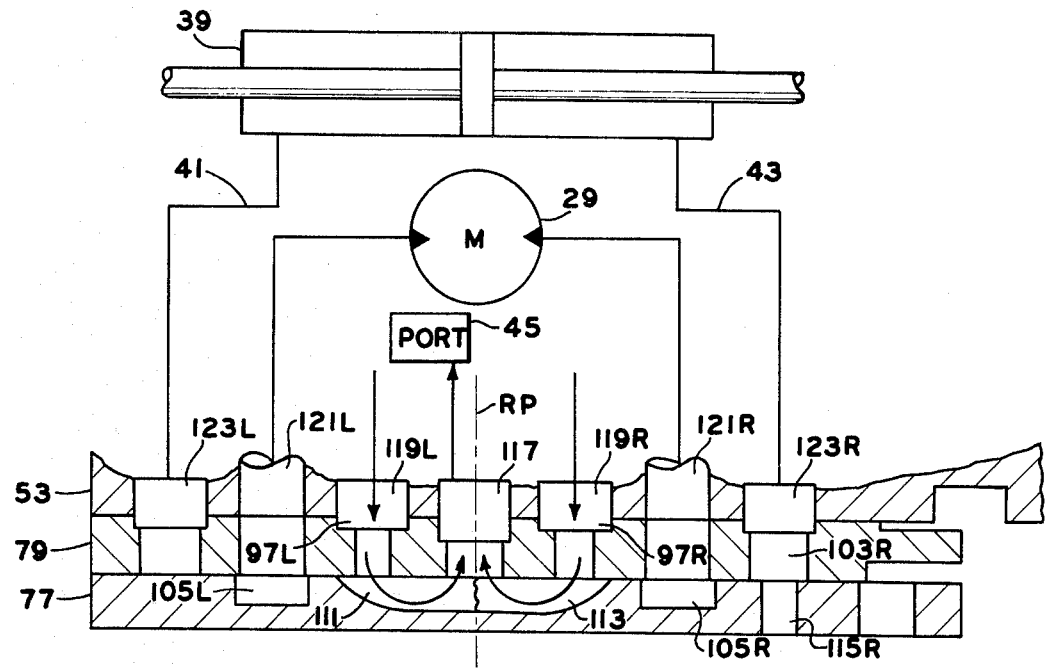
FIG. 4 is a semi-schematic cross section taken on lines 4—4 of FIG. 3.
Figure 3:
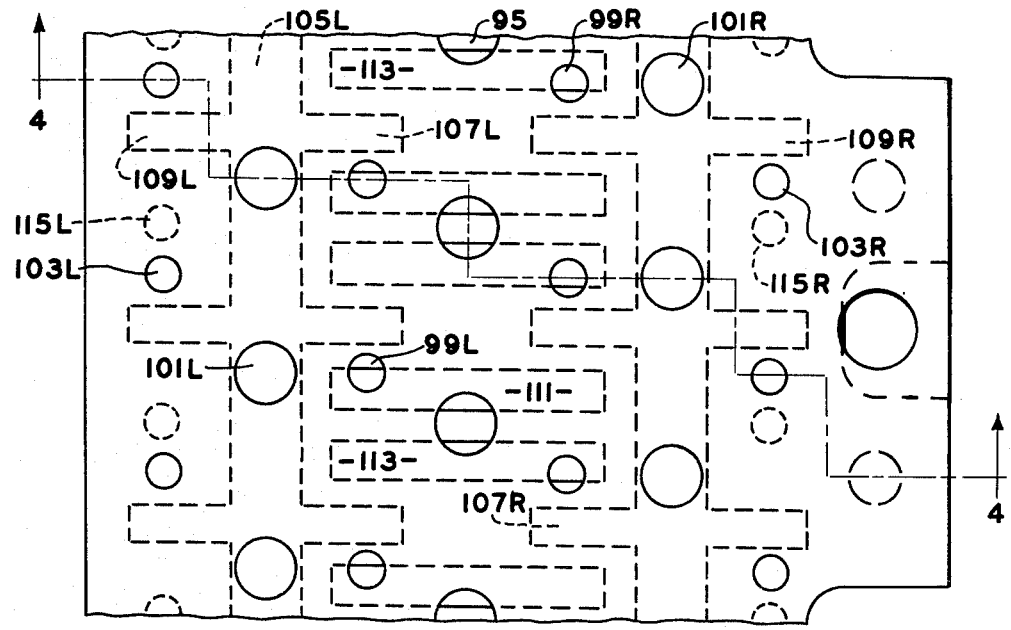
FIG. 3 is a fragmentary, overlaying view of the valve members of the present invention in their neutral position.

In connection with the subsequent description of the spool and sleeve in FIGS. 5 and 6, as well as the operational description of FIGS. 3 and 4, it should be noted that many of the apertures, orifices, passages, etc. are arranged in a mirror image with respect with the reference plane RP. Thus, such elements will be described by a reference numeral followed by either an R or L to indicate that the element is located on the right side or the left side, respectively, of the central reference plane RP. On the other hand, certain of the elements do not have a corresponding element oppositely disposed about the reference plane RP and will be referred to by use by a reference numeral alone.

Formed in the outer surface of the valve sleeve 79 is a centrally disposed circumferential groove 93 into which a plurality of orifices 95 open. Oppositely disposed about the plane RP are circumferential grooves 97L and 97R which communicate, respectively, with pluralities of pressure ports 99L and 99R. Disposed further from the reference plane RP are pluralities of meter ports 101L and 101R. Finally, valve sleeve 79 includes pluralities of operating ports 103L and 103R. It should be noted that in the subject embodiment, for each of the pluralities of ports, the circumferential spacing from one port to the next is substantially the same, and furthermore, although not all of the ports of each type are shown, there are six of each in the subject embodiment, although the number may vary.

The valve spool 77 has formed within its outer surface a pair of circumferential meter grooves 105L and 105R equally and oppositely disposed about reference plane RP. It should be noted that when the valve sleeve 79 is disposed about the valve spool member 77, the members 77 and 79 will be in the same axial relationship as is shown in FIGS. 5 and 6, with reference planes RP coincidental. Thus, the meter grooves 105L and 105R are axially aligned with, and in fluid communication with meter ports 101L and 101R, respectively. Extending axially inwardly (toward reference plane RP) from the meter grooves 105L and 105R are pluralities of circumferentially spaced apart passages 107L and 107R, wich are adapted to communicate with the pressure ports 99L and 99R when the spool 77 and sleeve 79 are in a certain relative rotational position. Extending axially outwardly from the meter grooves 105L and 105R are pluralities of operating passages 109L and 109R, each of which, in the subject embodiment, is axially aligned with one of the passages 107L or 107R. The operating passages 109L and 109R are adapted to communicate with the operating ports 103L and 103R, respectively, in response to a certain rotational relationship between the spool 77 and sleeve 79. As was noted in connection with sleeve 79, the individual passages comprising each of the above-described pluralities of passages preferably have uniform circumferential spacing therebetween, the circumferential spacing between the passages preferably being the same as that between the ports of the valve sleeve 79. Axially disposed between the meter grooves 105L and 105R and circumferentially disposed between adjacent passages 107L and 107R are a plurality of pairs of passages 111 and 113, the passage 11 being disposed to communicate between pressure port 99L and auxiliary port 95, while the passage 113 is adapted to communicate between the pressure port 99R and the auxiliary port 95 when the spool 77 sleeve 79 are in the neutral position with respect to each other, as will be explained in greater detail in connection with FIGS. 3 and 4.

In addition to the above-described passages formed in the outer surface of valve spool member 77, there is a plurality of tank ports 115L, circumferentially disposed between operating passages 109L and, oppositely disposed therefrom about reference plane RP, a plurality of tank ports 115R, circumferentially disposed between operating passages 109R. Each of the tank ports 115L and 115R is disposed to be aligned with, and in fluid communication with one of the operating ports 103L and 103R, respectively, in response to a certain relative position of the spool 77 and sleeve 79.

FIG. 3 is a fragmentary, overlaying view of both the valve spool 77 and valve sleeve 79, showing about 180° of each, with the members 77 and 79 being aligned in the neutral position as when the steering wheel is not being rotated. The solid lines indicate ports defined by the valve sleeve 79, whereas the dashed lines indicate ports and passages formed in the valve spool 77 and hidden from view by the valve sleeve 79. In the semischematic cross section shown in FIG. 4, a portion of the housing 53 is included, making it possible to illustrate schematically certain passages communicating between the valve means 15 and various controller ports, such as the inlet port 17, cylinder ports 31 and 33, etc. Among the passages defined by the housing 53 is an auxiliary passage 117, a pair of sources passages 119L and 119R, oppositely disposed meter passages 121L and 121R, and operating passages 123L and 123R. It should be noted in connection with FIG. 3 that, for purposes of clarity, circumferential grooves 93, 97L and 97R formed in the valve sleeve 79 are not shown. It will be understood, however, that because of grooves 97L and 97R, pressure ports 99L and 99R are always in fluid communication with passages 119L and 119R, respectively, regardless of the relative rotational position of valve spool 77 and sleeve 79.

The valve spool 77 and sleeve 79 disclosed herein may be considered as having, in general, three relative rotational orientations corresponding to the neutral (non-displaced) condition of the controller represented by FIGS. 3 and 4, and the left turn and right turn conditions. The left turn and right turn conditions in and of themselves form no part of the present invention, but are illustrated and explained in greater detail in U.S. application Ser. No. 679,607, filed Apr. 26, 1976, which is a continuation of Ser. No. 507,015, filed Sept. 18, 1974 now abandoned, by O. Johnson, entitled "Controller for Fluid Pressure Operated Devices", and assigned to the assignee of the present invention.

It may be appreciated that when fluid is flowing from source passages 119L and 119R through ports 99L and 99R and into passages 111 and 113, it is desirable that the flow be "balanced" so that the net tangential force acting on the valve spool 77 is zero. This is accomplished partly by communicating this auxiliary fluid flow into the passages 111 and 113 in opposite tangential directions, and having the pairs of passages uniformly spaced apart circumferentially around the valve spool.

Although the invention is being illustrated and described with reference to a power steering system having a particular flow order (i.e.: inlet port - fluid meter - cylinder - outlet port), it will be understood by those skilled in the art that the system could utilize a different flow order, including, but not limited to: inlet port - cylinder - fluid meter - outlet port. Thus, any reference hereinafter to the primary flow path (such as is used for steering) is intended to include either of the flow orders mentioned as well as combinations thereof.

Operation

In the neutral (non-rotating or non-displaced) position of the valve means, fluid entering the controller 13 at inlet port 17 flows through passages 119L and 119R, as illustrated in FIGS. 3 and 4, entering circumferential grooves 97L and 97R, from where it enters pressure ports 99L and 99R. As is best seen in FIG. 3, when the valve spool 77 and sleeve 79 are in the neutral position with respect to each other, each of the pressure ports 99L is in communication with one of the passages 111, and each of the pressure ports 99R is in communication with one of the passages 113, thus permitting the entire system fluid flow to be communicated to the passages 111 and 113. In the subject embodiment, when the valve means is in the neutral position, substantially all of the system fluid flow coming from the inlet port 117 through the passages 119L and 119R is communicated to passages 111 and 113. As may also be seen in FIG. 3, each of the orifices 95 defined by valve sleeve 79 are disposed to be in communication with both of the passages 111 and 113 when the valve means is in the neutral position. As is seen in FIG. 6, fluid passing through the orifices 95 enters circumferential groove 93 to provide continuous communication between the orifices 95 and the passage 117 (shown schematically in FIG. 4, but not in FIG. 1). Thus, regardless of the orientation of the valve means 15 within the controller housing 53, the entire system fluid flow is directed by the valve means through the passage 117, into the auxiliary port 45, from which it is fed to an auxiliary fluid device 47 (seeFIG. 1), when the controller is in the neutral position and does not require the full system fluid flow for operation of the steering cylinder 39.

It will be appreciated by reference to FIG. 3 that as the spool and sleeve begin to move relative to each other in either direction, the flow area permitting communication between pressure port 99L and orifice 95 and the flow area permitting communication between pressure port 99R and orifice 95 is progressively decreased. In the subject embodiment, after a small amount of relative rotational deflection, fluid communication between the inlet port 17 and the orifices 95 is prevented and the pressure ports 99L (or 99R) are in communication with the passages 107L (or 107R) to initiate a right turn (or a left turn), as is described in the above-mentioned application.

Although the present invention has been described in connection with a vehicle power steering system, it will be apparent that it may be applied to any controller of this type for use in a system where it is desired to have the full system fluid flow available upon demand to operate a primary device, while making the full system fluid flow available to a secondary or auxiliary device wherever the primary device is not being operated, the primary device having complete priority over the secondary device. Thus, it is apparent that the present invention achieves the above objective, and furthermore does so without the need of additional sensing devices or valving.

While the invention has been described with reference to a preferred embodiment, neither the illustrated embodiment nor the terminology employed in describing it is intended to be limiting; rather, it is intended to be limited only by the scope of the appended claims.

I claim:

1. A controller including a housing having an inlet for receiving a system fluid flow and an outlet, a pair of control fluid ports adapted for connection to a primary fluid pressure operated device and an auxiliary fluid port adapted for connection to an auxiliary fluid pressure operated device, said controller comprising:
   a. valve means rotatably disposed within said housing and defining a neutral position, an operating position, and a central plane oriented generally perpendicular to the axis of rotation of said valve means;
   b. a fluid meter associated with said housing and including a movable member operable to measure the volume of fluid passing through said fluid meter;
   c. said valve means cooperating with said housing to define first and second supply passages in continuous open communication with said inlet and a first flow path including said inlet, said first and second supply passages, said fluid meter, one of said control fluid ports, the other of said control fluid ports, and said outlet when said valve means is in said operating position;
   d. said valve means cooperating with said housing to define a second flow path communicating between said inlet and said auxiliary fluid port when said valve means is in said neutral position, said valve means defining first and second auxiliary passages communicating between said auxiliary fluid port and said first and second supply passages, respectively, when said valve means is in said neutral position, said first and second supply passages and said first and second auxiliary passages being oppositely and approximately equally disposed about said central plane; and
   e. said second flow path being capable of communicating substantially all of said system fluid flow and said system fluid flow being progressively redirected from said second flow path to said first flow path as said valve means shifts from said neutral position toward said operating position.

2. A controller as defined in claim 1 wherein said valve means comprises a primary, rotatable valve member and a cooperating, relatively rotatable follow-up valve member, said valve members defining said neutral position relative to each other.

* * * * *